US007640554B2

(12) United States Patent
Yamade

(10) Patent No.: US 7,640,554 B2
(45) Date of Patent: Dec. 29, 2009

(54) METHOD FOR INSTALLING A PRINTER DRIVER AND COMPUTER-READABLE MEDIUM STORING INSTALLATION PROGRAM

(75) Inventor: Yasushi Yamade, Yokohama (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 610 days.

(21) Appl. No.: 09/910,282

(22) Filed: Jul. 19, 2001

(65) Prior Publication Data

US 2002/0010806 A1 Jan. 24, 2002

(30) Foreign Application Priority Data

Jul. 24, 2000 (JP) ............... 2000-223135

(51) Int. Cl.
G06F 3/00 (2006.01)
G06F 9/44 (2006.01)
G06F 9/46 (2006.01)
G06F 13/00 (2006.01)

(52) U.S. Cl. .......................... 719/327; 710/8
(58) Field of Classification Search .......... 710/8–10; 717/168–178, 174; 719/321–327; 713/1, 713/100; 358/1.9, 1.18, 3.13, 1.1
See application file for complete search history.

(56) References Cited

U.S. PATENT DOCUMENTS

| | | | | |
|---|---|---|---|---|
| 5,781,797 A | * | 7/1998 | Crick et al. ............ | 710/10 |
| 5,794,052 A | * | 8/1998 | Harding ................ | 717/178 |
| 6,081,850 A | * | 6/2000 | Garney ................. | 710/15 |
| 6,148,346 A | * | 11/2000 | Hanson ................ | 719/321 |
| 6,384,922 B1 | | 5/2002 | Hayama et al. | |
| 6,426,798 B1 | * | 7/2002 | Yeung ................. | 358/1.13 |
| 6,513,159 B1 | * | 1/2003 | Dodson ............... | 717/178 |
| 6,775,768 B1 | * | 8/2004 | Raspe ................. | 713/2 |
| 6,879,408 B1 | * | 4/2005 | Hori et al. ............ | 358/1.13 |
| 7,280,245 B2 | * | 10/2007 | Nishikawa et al. ..... | 358/1.15 |
| 2005/0168777 A1 | * | 8/2005 | Nishikawa et al. ..... | 358/1.15 |

FOREIGN PATENT DOCUMENTS

| | | |
|---|---|---|
| JP | 08-108602 A | 4/1996 |
| JP | 10-181158 | 7/1998 |
| JP | 10-254708 | 9/1998 |
| JP | 10-283129 A | 10/1998 |
| JP | 11-102244 A | 4/1999 |
| JP | 2000-163231 A | 6/2000 |

OTHER PUBLICATIONS

Official Notice of Reason for Refusal in corresponding Japanese Application No. 2000-223135 dated Oct. 30, 2009 with English Translation.

* cited by examiner

*Primary Examiner*—Diem K Cao
(74) *Attorney, Agent, or Firm*—Buchanan Ingersoll & Rooney PC

(57) ABSTRACT

One of the printer drivers is selected from multiple printer drivers stored in a recording medium by referring to regional information set in the computer in advance and in accordance with the referred regional information. The selected printer driver is to be installed in the computer. It is also possible to select setup information that includes a screen display language, a default printing paper size, and a measurement unit system, instead of selecting a printer driver itself, and have the setup information to be installed in the computer.

33 Claims, 13 Drawing Sheets

METHOD FOR INSTALLING A PRINTER DRIVER AND COMPUTER-READABLE MEDIUM STORING INSTALLATION PROGRAM

This application is based on the Japanese Patent Application No. 2000-223135 filed Jul. 24, 2000, the contents of which are hereby incorporated by reference

BACKGROUND OF THE INVENTION

1. Field of the Invention

The invention relates to the method for installing a printer driver and computer-readable medium storing installation program.

2. Description of Related Art

The same printer model is often used worldwide these days. Therefore, it is necessary to prepare printer drivers with specifications suitable for each region of the world because the language, the measuring unit system, and the standard paper size for each region are generally different. For example, a printer driver intended for an English speaking region is necessary to be able to express messages in English on the printer driver screen to display the setup status for printing conditions, while a printer driver intended for a Japanese speaking region is necessary to be able to express messages in Japanese to display the same in Japanese.

In distributing printer drivers intended for various regions, it is desirable to prepare separate recording media such as CD-ROMs and flexible disks (FDs) for each region to store printer driver for each region. However, this requires multiple kinds of CD-ROMs and flexible disks (FDs) to be prepared. It is difficult to use this distribution method because of the higher manufacturing cost. Therefore, what is generally done is to distribute a single CD-ROM storing aim multiple printer drivers prepared for users in various regions in order to reduce the manufacturing cost.

However, this causes a burden on the user to select and install a proper printer driver suitable for the particular region where the printer is used if the CD-ROMs containing multiple kinds of printer drivers are distributed. Consequently, a user who is not familiar with software installation may end up installing a printer driver for a wrong region.

A method for automatic selection and installation of printer drivers is disclosed in the JPA Hei 10 (1998)-181158. The installation method described in this publication automatically judges the computer (CPU) model and the operating system's version and makes a correct selection of the corresponding printer driver to be installed.

However, although the installation method described in the above publication may be able to prevent the user from installing a printer driver for a wrong model, it cannot prevent a printer driver for a wrong region being installed by mistake.

SUMMARY OF THE INVENTION

It is an object of the invention to provide a method for automatically selecting a printer driver suited for the region where the computer terminal is used and installing it to the computer terminal as well as a computer-readable medium, in which an installation program is stored.

It is another object of this invention to provide a method for automatically selecting a setup suited for the region where the computer terminal is used and installing a printer driver to the computer terminal as well as a computer-readable medium, in which installation programs are stored.

According to an aspect of the invention, a method for installing a printer driver stored on a recording medium on a computer terminal have a step of referring regional information set in the computer terminal in advance, a selection step of selecting one of the multiple printer drivers stored on the recording medium on the basis of the referred regional information, and a step of installing the selected printer driver on the computer terminal.

According to another aspect of the invention, a method for installing a printer driver stored on a recording medium on a computer terminal have a step of referring regional information set in the computer terminal in advance, a selection step of selecting a piece of setup information from multiple pieces of information stored on the recording medium on the basis of the referred regional information, and a step of installing a control program contained in the printer driver and the selected piece of setup information on the computer terminal.

According to still another aspect of the invention, a computer readable medium stores multiple printer drivers and an installation program for installing one of the printer drivers to a computer terminal. The installation program causes a computer to execute a process. The process comprises a step of referring regional information set in the computer terminal in advance, a selection step of selecting one of the multiple printer drivers stored on the computer readable medium on the basis of the referred regional information, and a step of installing the selected printer driver on the computer terminal.

According to further aspect of the invention, a computer-readable medium stores a printer driver containing a control program and multiple pieces of setup information corresponding to each regional information, and an installation program for installing the printer driver to a computer terminal. The installation program causes a computer to execute a process. The process comprises a step of referring regional information set up on the computer terminal in advance, a selection step of selecting a piece of setup information from multiple pieces of information stored on the computer-readable medium on the basis of the referred regional information, and a step of installing a control program contained in the printer driver and the selected piece of setup information on the computer terminal.

In carrying out our invention in one preferred mode, it is not necessary to prepare multiple kinds of recording media where printer drivers for different regions are stored, so that the shipping management can be made simpler. Moreover, since it is not necessary to prepare the recording media separately, it is possible to produce the same recording medium in large quantity and, as a result, can reduce the production cost due to the mass production effect. Moreover, the distribution of the printer driver when upgrading becomes easier.

Furthermore, it is possible for the user to prevent an accidental installation of a printer driver intended for a wrong region. Moreover, the user does not have to select a printer driver for the intended region among multiple printer drivers, thus the user's burden concerning the installation can be lessened.

DESCRIPTIONS OF THE PREFERRED EMBODIMENTS

Preferred embodiments of the invention are described below with reference to the accompanying drawings.

Embodiment 1

Figure 1:
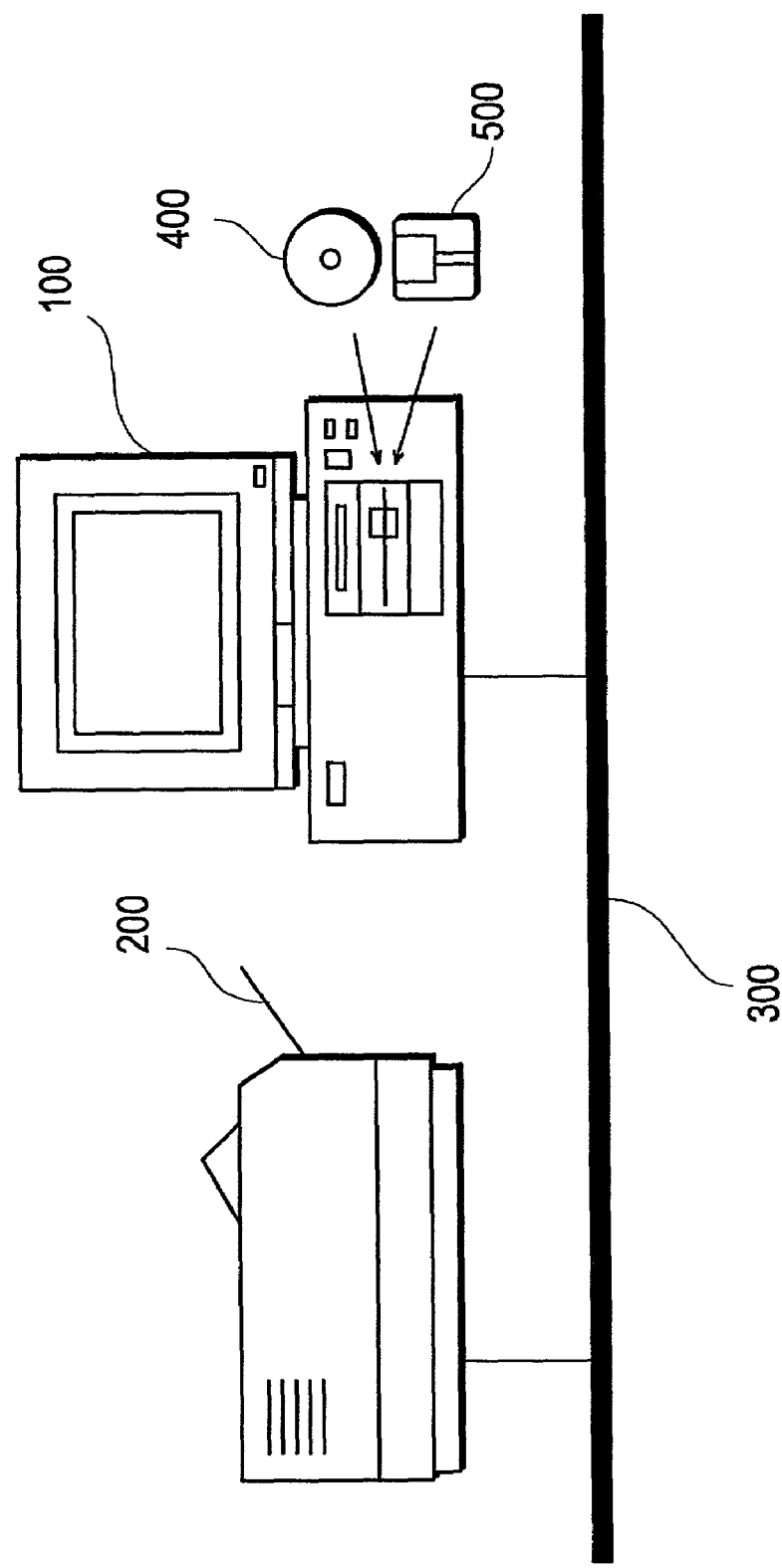
FIG. 1 is a block diagram that shows a system that has a printer and a computer, to which a printer driver according to the first embodiment is installed.

FIG. 1 is a block diagram that shows a system that has a printer and a computer, to which a printer driver according to the first embodiment is installed.

A computer 100 and a printer 200 are connected via a network 300 to be able to communicate with each other. A printer driver program (hereinafter called "printer driver") suitable for the printer 200 is installed in the computer 100. The printer driver is provided by being recorded on a recording medium such as a CD-ROM 400 or a flexible disk (FD) 500. The printer driver is installed on the computer 100 as it reads the content of the recording medium.

Figure 2:
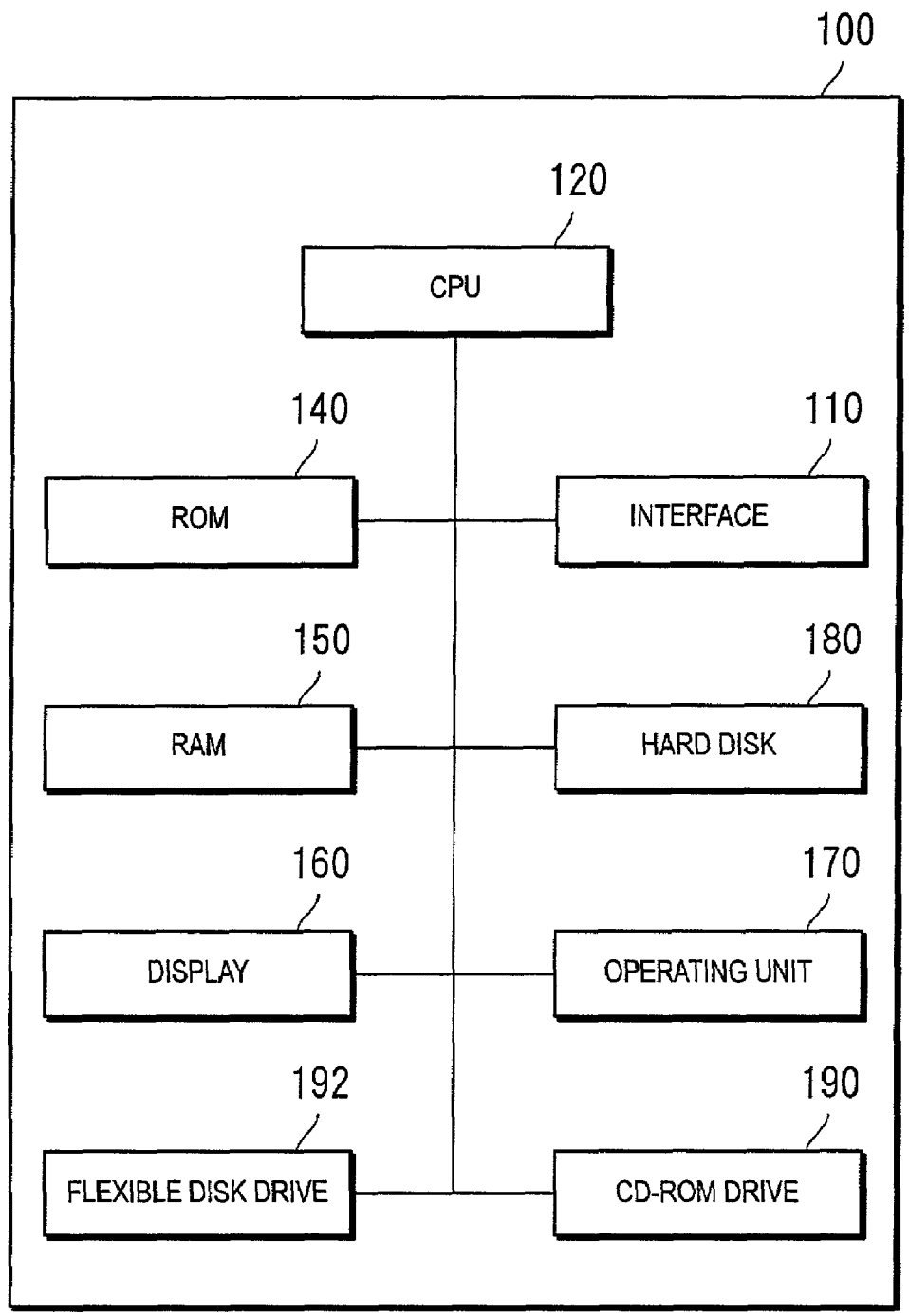
FIG. 2 is a block diagram that shows an outline structure of the computer shown in FIG. 1.

FIG. 2 is a block diagram that shows an outline structure of the computer. The computer 100 has an interface 110, a CPU 120, a ROM 140, a RAM 150, a display 160, an operating unit 170, a hard disk 180, a CD-ROM 190, and a flexible disk driver 192.

The interface 110 is used for exchanging data communication with the printer 200. The interface 110 is specifically a network interface card (NIC) and parallel interface. The CPU 120 is in charge of the entire control of the computer 100 on the basis of the program.

The ROM 140 stores the control program of the BIOS (basic input/output system) etc. The RAM 150 has an area to store the data temporarily. The RAM 150 has a working area for converting document data and/or image data into a page description language.

The display 160 is used for displaying screens for setting up various printing conditions, e.g., setup for printing paper size, single/both side printing, and punching or stapling processes, as well as for showing the current printing condition setup status. The operating unit 170 consists of a pointing device, such as a mouse, and/or keyboard. The operating unit 170 is used for inputting various printing conditions and instructing the start of installation of the printer driver into the computer 100.

The hard disk 180 stores the operating system and various application programs for preparing text data and/or image data. The printer driver is installed into the hard disk 180.

The CD-ROM drive 190 reads the data and programs recorded on the CD-ROM 400. The flexible disk drive 192 reads the data and the programs stored in the flexible disk 500.

Figure 3:
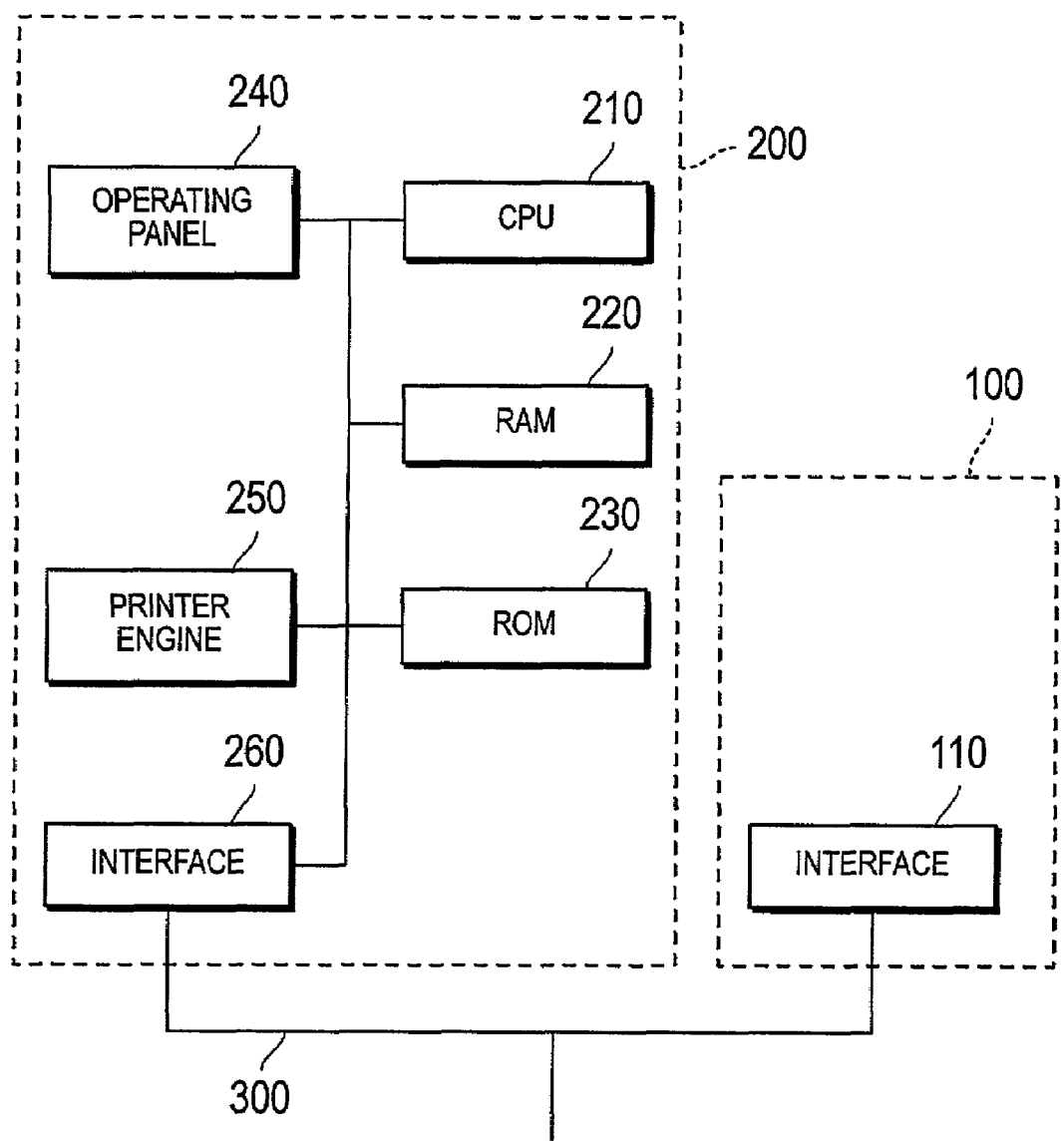
FIG. 3 is a block diagram that shows an outline structure of the printer shown in FIG. 1.

FIG. 3 is a block diagram that shows an outline structure of the printer. The printer 200 has a CPU 210, a RAM 220, a ROM 230, an operating panel 240, a printer engine 250, and an interface 260. As structural elements are identical to those of the conventional printer, so that detailed descriptions are skipped here. The interface 260 is specifically a network interface card (NIC) or a parallel interface.

Figure 4:
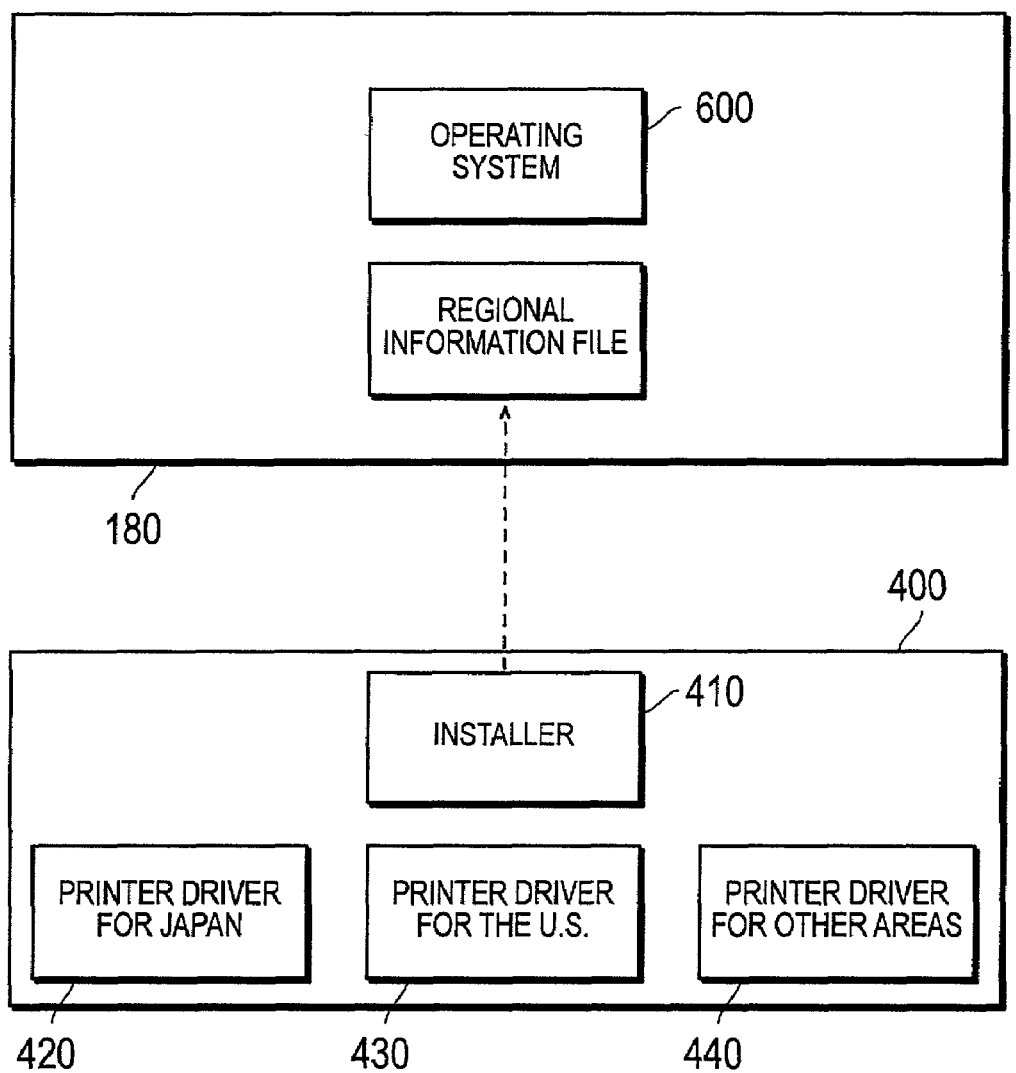
FIG. 4 is a drawing that conceptually shows the structure of the software contained in a CD-ROM, in which the printer driver according to the first embodiment is recorded.

FIG. 4 is a drawing that conceptually shows the structure of the software contained in a CD-ROM, in which the printer driver according to the first embodiment is recorded. n installer 410 and multiple printer drivers are stored in the CD-ROM 400. In this embodiment, the multiple printer drivers include a printer driver 420 for Japan, a printer driver 430 for the United States, and a printer driver 440 for other regions. However, the printer drivers are not limited to them.

The installer 410 is an installation program for installing one of the printer drivers. When the installer 410 is executed, the CPU 120 automatically refers to the regional information, which is set in advance in the computer 410. This regional information is set by the specified software such as an operating system 600, which is described later. Consequently, one printer driver is selected from multiple printer drivers 420, 430, and 440 based on the referred regional information. Only the selected printer driver is installed into the hard disk 180 of the computer 410.

Figure 5:
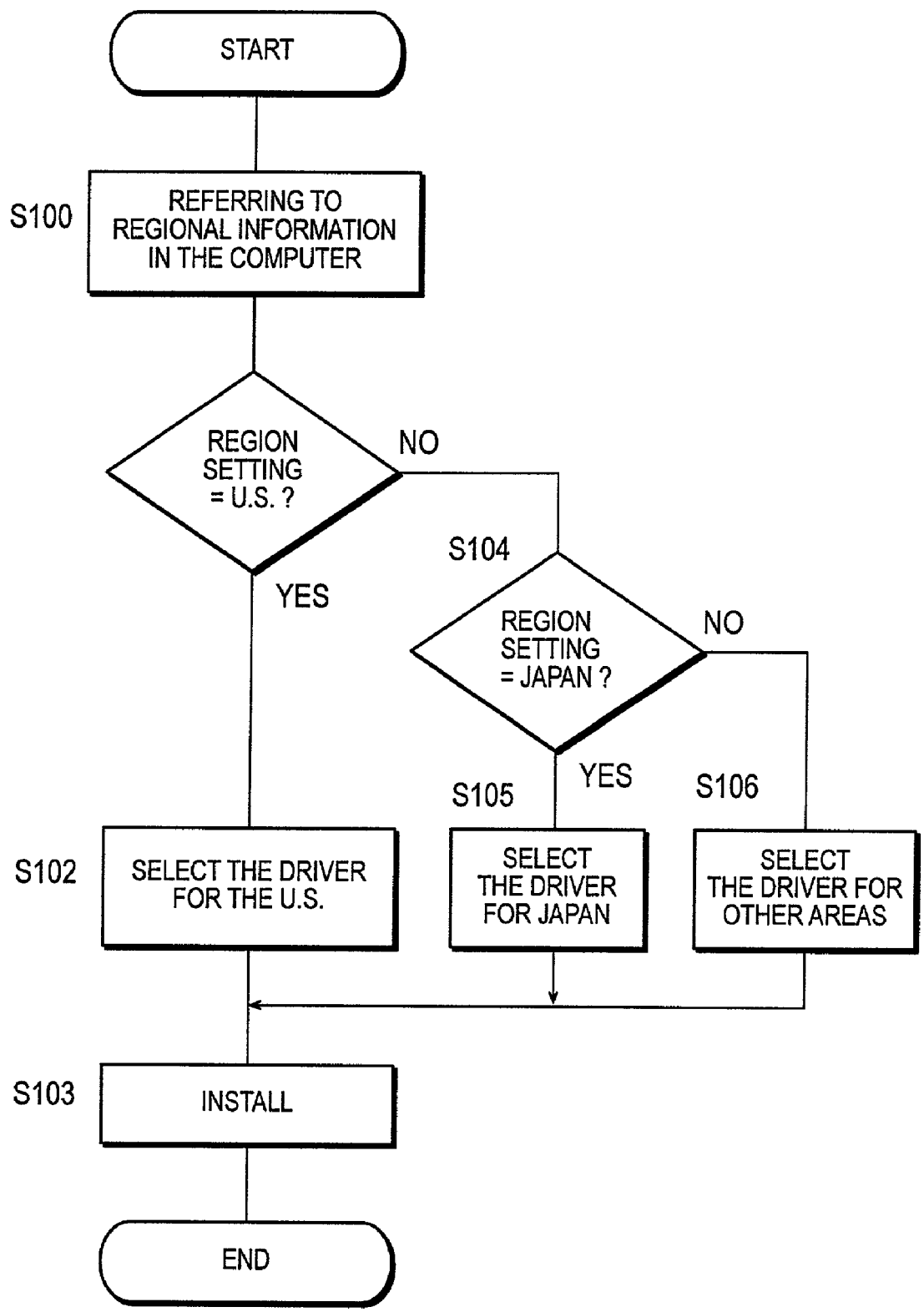
FIG. 5 is a flow chart that shows the method for installing the printer driver in the first embodiment.

FIG. 5 is a flow chart that shows the method for installing the printer driver in the first embodiment. The algorithm indicated in the flow chart shown in FIG. 5 is stored in the recording medium as a program and is executed by the CPU 120 as it is read into the computer 100.

At the step S100, the regional information stored in the computer 100 in advance is referred. The user sets the regional information in advance by using the operating system 600. The sequence of setting the regional information varies with the type of operating system 600. In case of a general operating system 600, a regional information setup panel is displayed on the display panel 160 first. Next, the region where the computer 100 is used is specified on the regional setup panel. The instructions are made through the operating unit 170. Consequently, the regional information is stored in the registry of the computer 100 under a specified file name.

In installing a printer driver, the installer 410 is activated by clicking a desired icon on the screen that corresponds to the installer 410. It is also possible to activate the installer 410 automatically, different from this embodiment. When the installer 410 becomes activated and executed, the file name that is registered in advance as mentioned above is retrieved and the regional information stored in the file is automatically referred to.

At the step S101, a judgment is made whether the United States is assigned in the referred regional information. If the United States is assigned in the regional information (S101: Yes), the process of the step S102 is executed. If the United States is not assigned in the regional information (S102: No), the process of the step S104 is executed.

At the step S102, a printer driver 430 for the United States is selected from the multiple printer drivers stored by the regions. More specifically, a table is stored in the CD-ROM 400. The table correlates the regional information with addresses where printer drivers for various regions are stored in the CD-ROM 400. Therefore, when the United States is assigned in the regional information in the computer 100, a printer driver 430 for the United States can be selected by specifying the address corresponding to the regional information referring to the table.

At the step S103, the selected printer driver 430 for the United States is installed in the hard disk 180 provided in the computer 100. The language used for displaying the setup status of the printing condition is English according to the specification of the printer driver 430 for the United States. The initial setup (default) of the printing paper size is the letter size (US Letter Size: 215.8 mm×279.3 mm). The measurement unit system for indicating the printing paper size and the printing area is the inch system.

At the step S104, a judgment is made whether Japan is assigned in the referred regional information. If Japan is assigned in the regional information (S104: Yes), the process of the step S105 is executed. If Japan is not assigned in the regional information (S104: No), the process of the step S106 is executed.

At the step S105, a printer driver 420 for Japan is selected from the multiple printer drivers 420, 430 and 440. More specifically, at the step S105, the selected printer driver 420 for Japan is installed in the hard disk 180 provided in the computer 100. The language used for displaying the setup status of the printing condition is Japanese according to the specification of the printer driver 420 for Japan. The default value of the printing paper size is the A4 size. The measurement unit system for indicating the printing paper size and the printing area is the metric system.

At the step S106, the printer driver 440 for other regions is selected. According to the printer driver 440 for other regions, the display language used for displaying the setup status of the printing condition is English. The default printing paper size is the A4 size. The unit system for indicating the printing paper size and the printing area size is the metric unit system.

As can be seen from the above, the method for installing the printer driver corresponding to the first embodiment refers to the regional information preset in the computer 100, to which the printer driver is supposed to be installed. A printer driver having a content that suits the specified regional information is automatically selected on the basis of the referred regional information from the multiple printer driver 420, 430 and 440 stored in the CD-ROM 400, and the selected printer driver will be installed. Therefore, there is no need for the user to select the one that is suitable for the particular region according to this embodiment.

Embodiment 2

The installation method according to the second embodiment is different from that of the first installation method. According to the second embodiment, printer driver itself is not selected but rather a piece of various setup information of the printer driver from multiple pieces of the information, for example, the information about the display language, the information on the printing paper size, and the information on the measurement unit system are selected according to the regional information.

The structure of the printer and the computer, in which the printer driver is supposed to be installed, in the second embodiment is similar to the first embodiment shown in FIG. 1, FIG. 2 and FIG. 3, so that the detail description is eliminated. The structural elements that are identical to those of the first embodiment are identified by using the same numbers as in the first embodiment.

Figure 6:
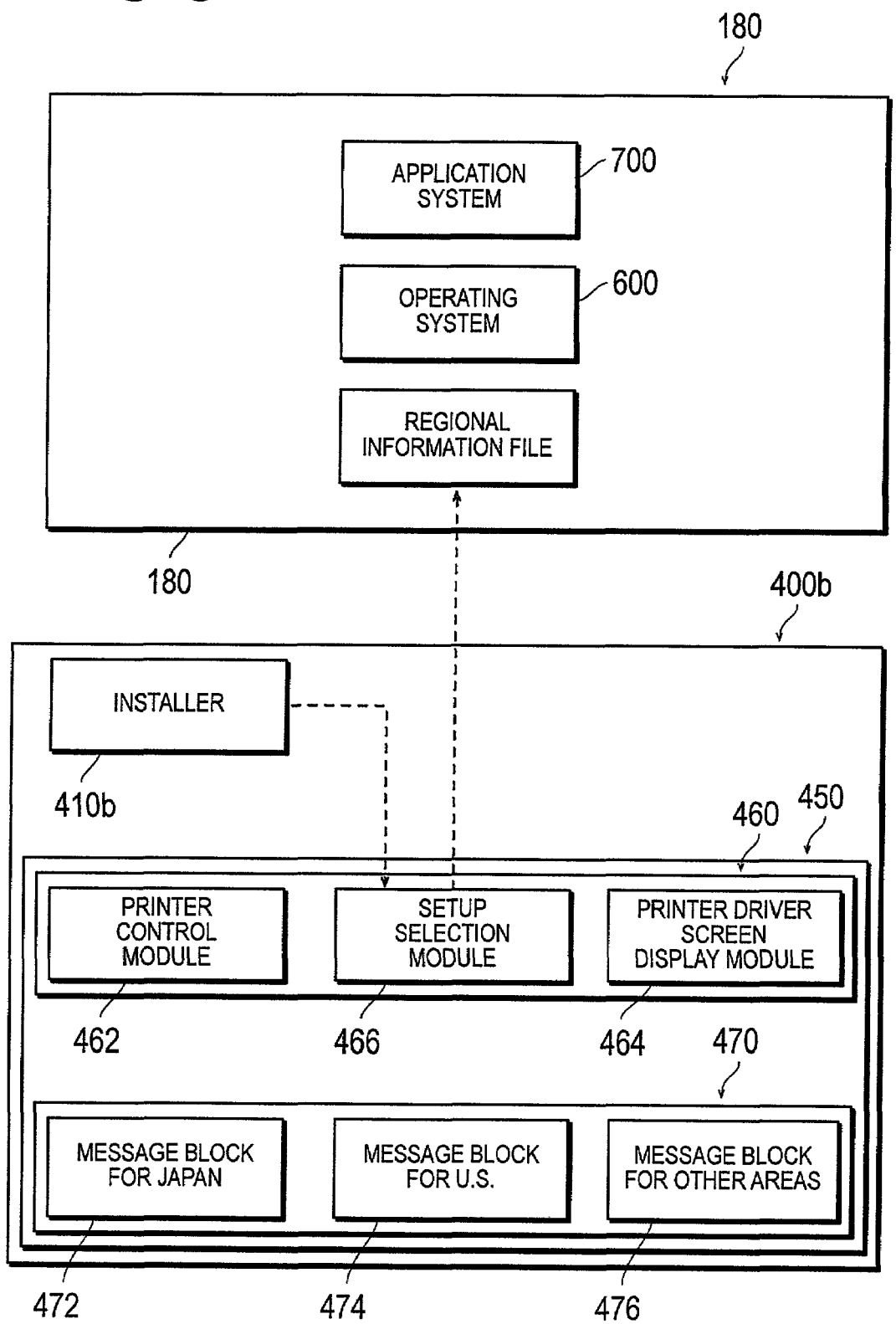
FIG. 6 is a drawing that conceptually shows the structure of the software contained in a CD-ROM, in which the printer driver according to the second embodiment is recorded.

FIG. 6 is a drawing that conceptually shows the structure of the software contained in a CD-ROM, in which the printer driver according to the second embodiment is recorded.

An installer 410b and a printer driver 450 are stored in a CD-ROM 400b. In this embodiment, only one printer driver 450 is stored in one CD-ROM 400b. Multiple printer drivers corresponding to multiple regions are not stored.

The printer driver 450 includes a control program block (control program area) 460 and a message block (message area) 470. The control program block 460 is a common control program that does not depend on individual regional information. The message block 470 is divided into a message block 472 for Japan, a message block 474 for the United States, and a message block 476 for other regions. More specifically, the message block 470 contains the information about the display language, the information about the default value of the printing paper size to be used in the printer, and the information concerning the default value of the measurement unit system used in the printer condition setup for each region.

The control program block 460 contains a printer control module 462, a printer driver screen display module 464, and a setup selection module 466 as functional elements.

The printer control module 462 and the printer driver screen display module 464 are similar to the functional elements that the normal printer driver has. The printer control module 462 is the functional elements for converting the document data and/or image data prepared by the application program 700, etc., into a format that can be printed by the printer 200. More specifically, the printer control module 462 has a function to convert the prepared text data and/or image data into page describing language. On the other hand, the printer driver image display module 464 is a functional element to display a setup screen for the printing conditions such as printing paper size, single/both side printing, number of sheets of printing, number of copies of printing, image direction, and finishing process, as well as a screen for showing the current setup status of the printing condition on the display 160.

The setup selection module 466 is a functional element specific to the present embodiment. The setup selection module 466 is a functional element for selecting the content of setup by automatically referring to the regional information set in the computer. The setup is selected by selecting the setup information based on the regional information. More specifically, the selection of each setup is conducted by selecting the message blocks 472, 474 and 476 based on the regional information.

Figure 7:
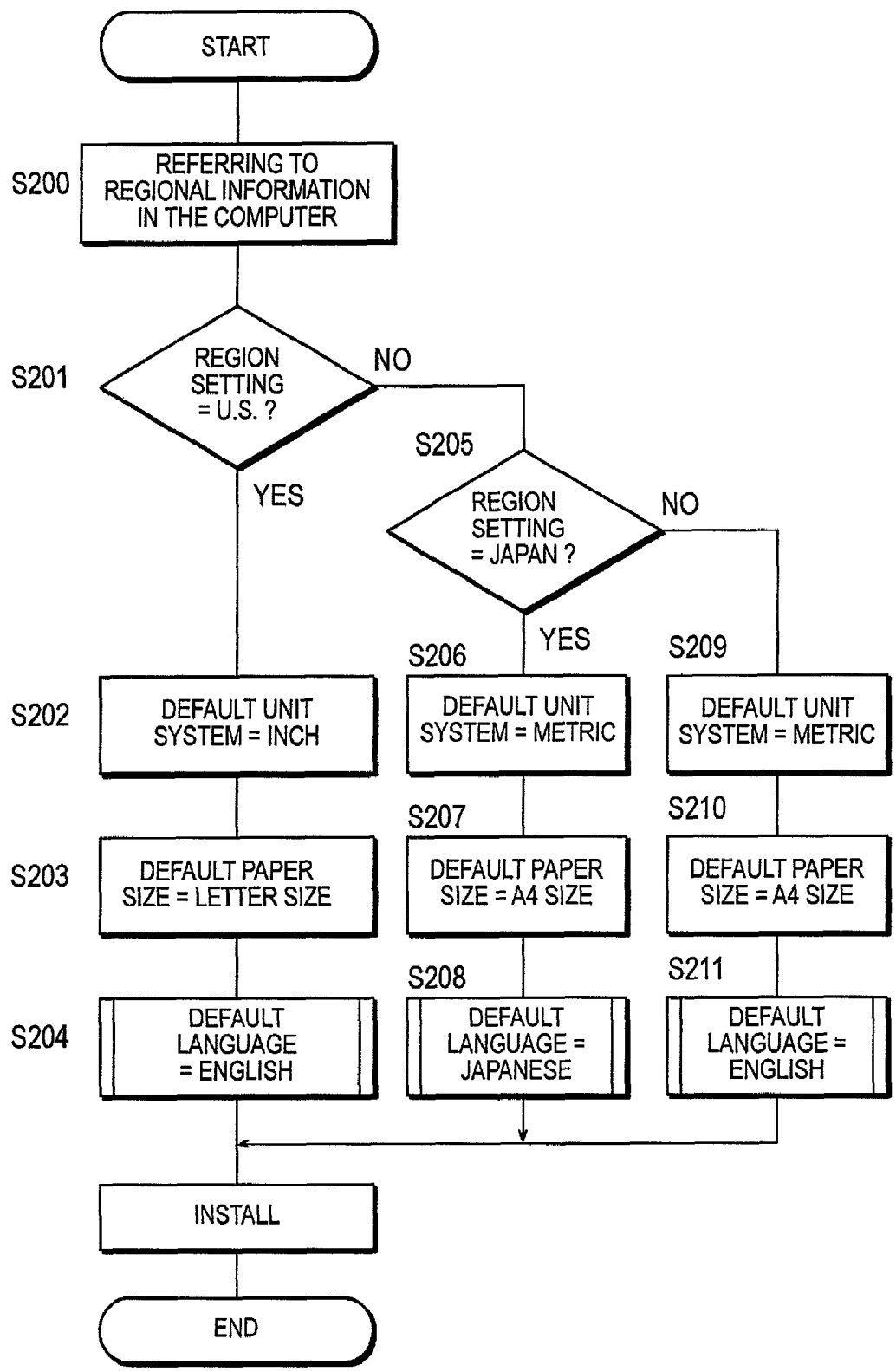
FIG. 7 is a flow chart that shows the method for installing the printer driver in the second embodiment.

FIG. 7 is a flow chart for describing the installation method of the printer driver of the second embodiment. The algorithm indicated in the flow chart shown in FIG. 7 is recorded on the recording medium as a program executable by the computer 100, and is executed by the CPU 120 as the computer 100 reads it.

At the step S200, the regional information stored in the computer 100 in advance is referred to. The user sets the regional information in advance by using the operating system 600. The specific setting sequence of the regional information is the same as it is described concerning the step S100 of FIG. 5 and the regional information is stored in the internal registry of the computer 100 under the specific file name.

In installing the printer driver 450, the installer 410b is activated. In coordination with the activation of the installer 410b, the setup selection module 466 contained in the control program block 460 of the printer driver 450 is executed. As a result of the execution of the setup selection module 466, the abovementioned file name is retrieved automatically, and the regional information stored in the file is referred.

At the step S201, a judgment is made whether the United States is assigned in the referred regional information. If the United States is assigned in the regional information (S201: Yes), the process of the step S202 is executed. If the United States is not assigned in the regional information (S201: No), the process of the step S205 is executed.

At the step S202, the unit system information is selected for setting and displaying the printing condition. More specifically, the inch system, which is commonly used in the United States, is selected as the default setting of the unit system for indicating the printing paper size and the printing area.

At the step S203, the information of the printing paper size to be used in the printer 200 is selected. More specifically, the letter size, which is commonly used in the United States, is selected as the default setup.

At the step S204, the language information used for displaying the setup status of the printing condition is selected. More specifically, English is selected as the display language for displaying the setup status of the printing condition on the screen.

Figure 8:
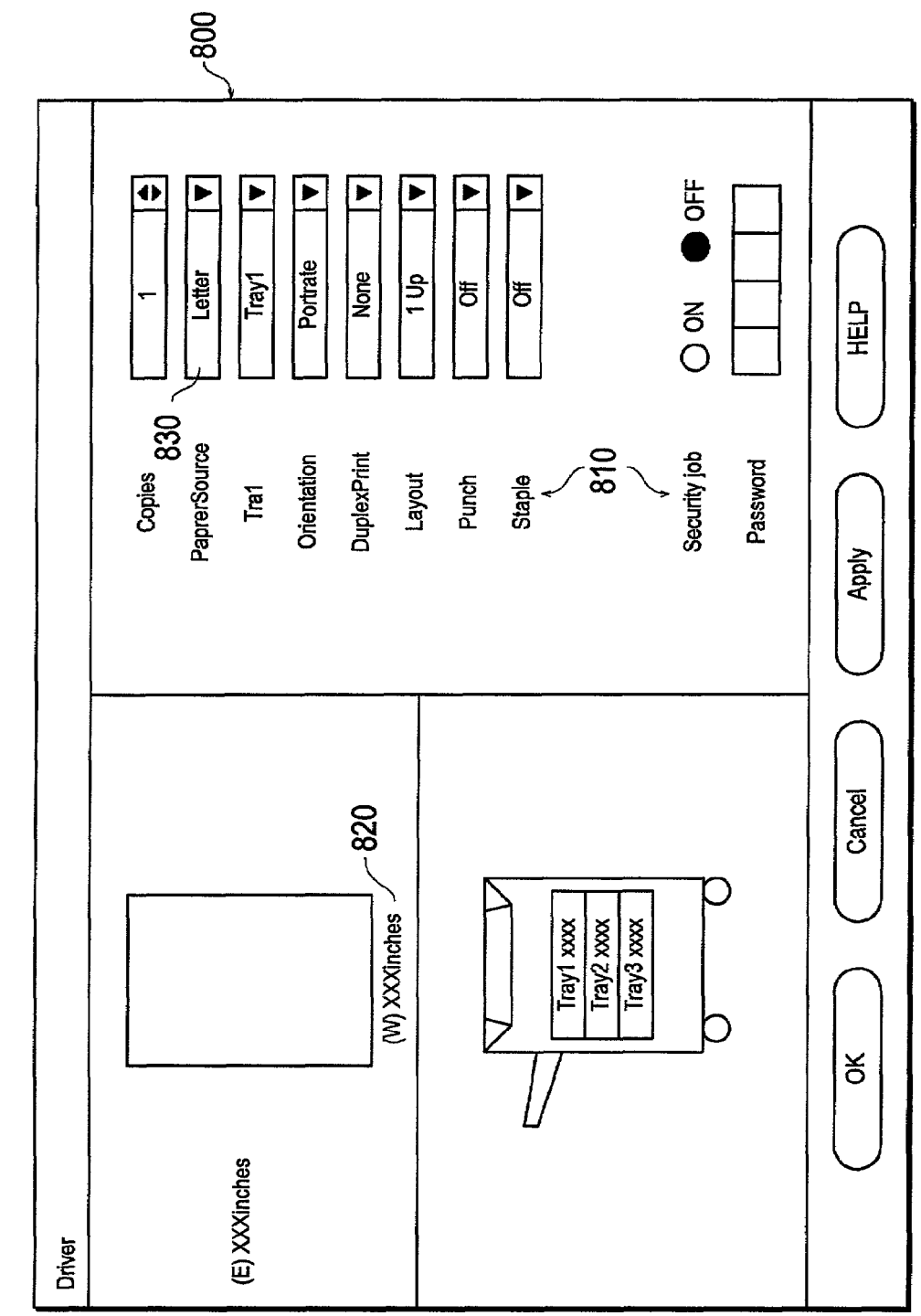
FIG. 8 is an example of a display screen wherein the United States is assigned in the regional information.

FIG. 8 is an example of a display screen wherein the United States is assigned in the regional information. The display screen (printer driver screen) 800 shows the setup status of the printer's printing condition. The display screen 800 contains a print preview display for confirming how would a printed page look like prior to printing, an option display for confirming the contents of options such as a tray attached to the main unit of the printer 200, and setup columns for inputting various setup information.

As shown in FIG. 8, a display language 810 to be used in the display screen 800 is English. In a screen immediately after installing the printer driver, all the setup items are set to the default values so that a measuring unit system 820 used for setting the printer is set to the inch system. The printing paper size 830 is set to the letter size.

At the step S205 of FIG. 7, a judgment is made whether Japan is assigned in the referred regional information referred. If Japan is assigned in the regional information referred (S205: Yes), the process of the step S206 is executed. If Japan is not assigned in the regional information referred (S205: No), the process of the step S209 is executed.

At the step S206, the metric system, which is commonly used in Japan, is selected as the default setting for the measurement unit system to be used for setting the printing condition. At the step S207, the A4 size, which is commonly used in Japan, is selected as the default value of the printing paper size. As the step S208, Japanese is selected as the display language.

Figure 9:
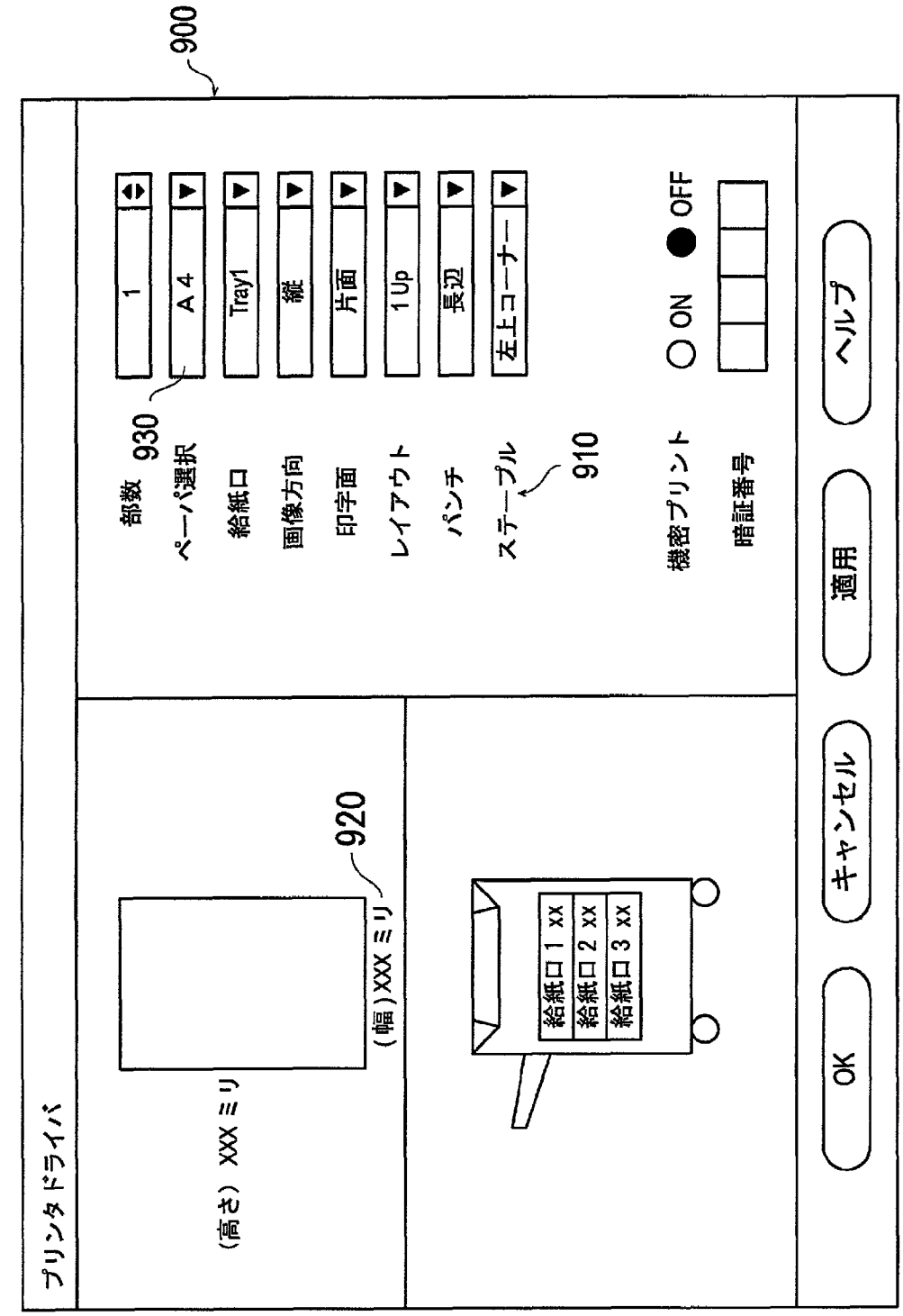
FIG. 9 is an example of a display screen wherein Japan is assigned in the regional information.

FIG. 9 is an example of the display screen when Japan is assigned in the regional information. As shown in FIG. 9, the display language 910 used in the display screen 900 is Japanese. The meanings of the Japanese words shown in FIG. 9 approximately correspond word for word to those of the English words shown in FIG. 8.

Since all the set items are set to the default values on a screen immediately after the printer driver is installed, the unit system 920 used in various setups of the printer is setup according to the metric unit system. The printing paper size 930 is set up to the A4 size.

At the steps S209 through S211 of FIG. 7, the system executes the processes designed for the case when neither the United States nor Japan is specified in the regional information. In other words, in case neither the United States nor Japan is specified in the regional information in the printer driver 450 where the message blocks 472 and 474 for the United State and Japan are prepared, the predetermined setup information for other regions (i.e., message block 476) is selected. Therefore, if the display language and the measurement unit system corresponding to the referred setup information do not exist, the predetermined setup is automatically selected. In case of this embodiment, the display language is English, the default measurement unit system is the metric system, and the default printing paper size is the A4 size.

At the step S212, the common control programs that do not depend on regions such as the printer control module 462 and a printer driver screen display module 464b contained in the printer driver, as wells the setup information such as the display language selected according to each regional information are installed into the computer 100.

The processing order of the steps S202 through S204 of FIG. 7 can be exchanged. The same thing can be said in the case of the steps S206 through S208 as well as the steps S209 through S211.

The selection process of the display language shown in the steps S204 through S208 of FIG. 7 is described in the following.

The display language is selected by specifying the memory address (storage address) of each of the message blocks 472, 474 and 476. More specifically, the display language is set by specifying the leading address of each of the memory blocks 472, 474 and 476.

Figure 10:
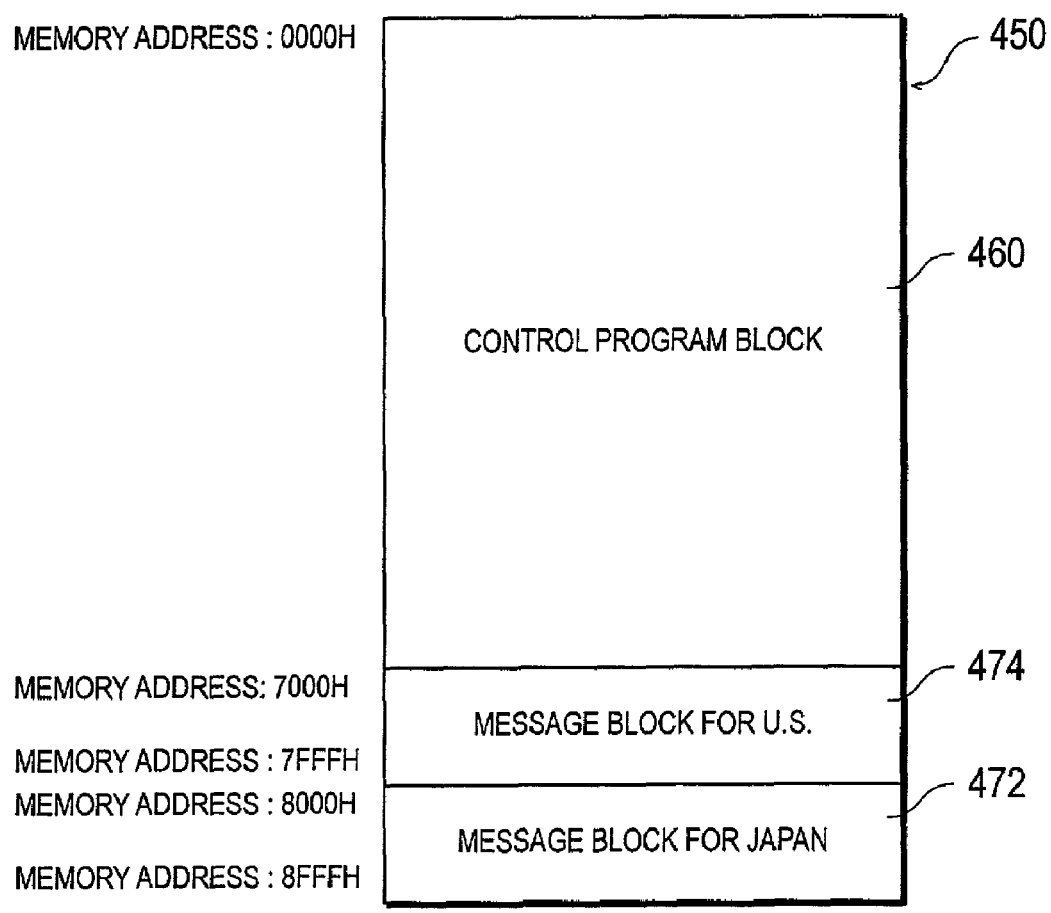
FIG. 10 is a memory map showing the relation between the software structure and memory addresses of the printer driver in the second embodiment.

FIG. 10 is a memory map showing the relation between the software structure and memory addresses of the printer driver in the second embodiment. As shown in FIG. 10, the message block for the United States 474 and the message block for Japan 472 are stored in each memory area. In case of FIG. 10, the memory address of the control program block 460 corresponds to 000H through 6FFFH. The memory address of the message block for the United State 474 corresponds to 7000H through 7FFFH. The memory address of the message block for Japan 476 corresponds to 8000H through 8FFFH. The description of the message block for other regions 476 is omitted.

When the message blocks 472 and 474 are structured as described above, various setup information such as the display language is selected by specifying the memory address corresponding to the referred regional information.

It is desirable to maintain commonality between the data structures of the message blocks 472 and 474. The necessary to specify the address for each word used on the display screen can be eliminated by maintaining the commonality between the data structure. As a result, it is possible to set up all the words used in the display screen completely in English or Japanese by specifying only the leading address of the message block to be used. Even in setting up the display of all the words completely in Japanese, the words such as OK, ON and OFF which are commonly used in Japanese can be displayed in English.

Figure 11:
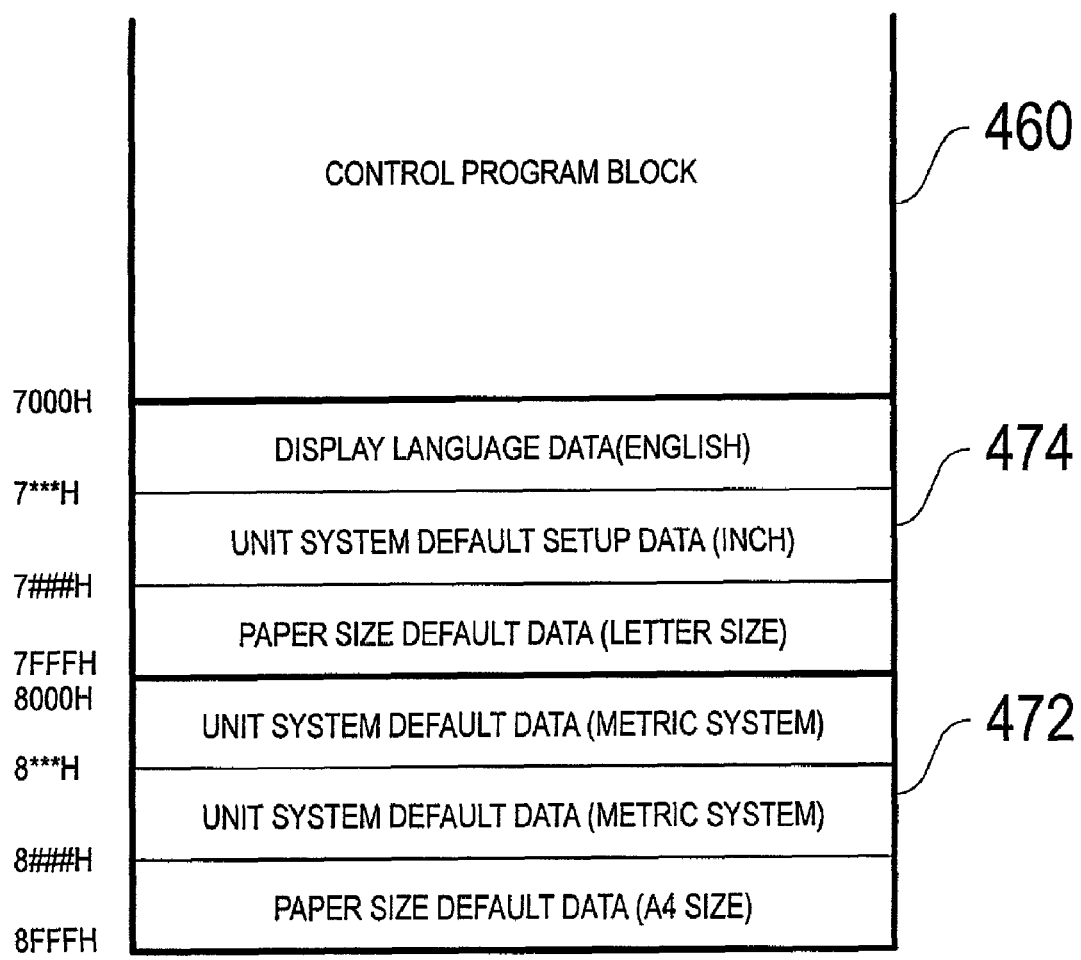
FIG. 11 is a memory map showing the relation between the data concerning the display language, the measuring unit system, and the printing paper size and their addresses.

The message blocks 472 and 474 can store not only the information about the display language, but also the default setting of the information concerning the printing paper size and the default setting of the measurement unit system. FIG. 11 shows the relation between the setup information and the memory address. As shown in FIG. 11, the necessity for specifying the address for each information by establishing in advance the relations between the information about the display language, the information about the default setting of the measurement unit system, and the information about the printing paper size. As a result, it becomes possible to select the information concerning the display language, the measurement unit system, and the printing paper size having the contents that fit to the regional information by specifying the leading addresses of the memory blocks 472 and 474. However, it is also possible to adopt a structure to select the setting individually according to the regional information.

Figure 12:
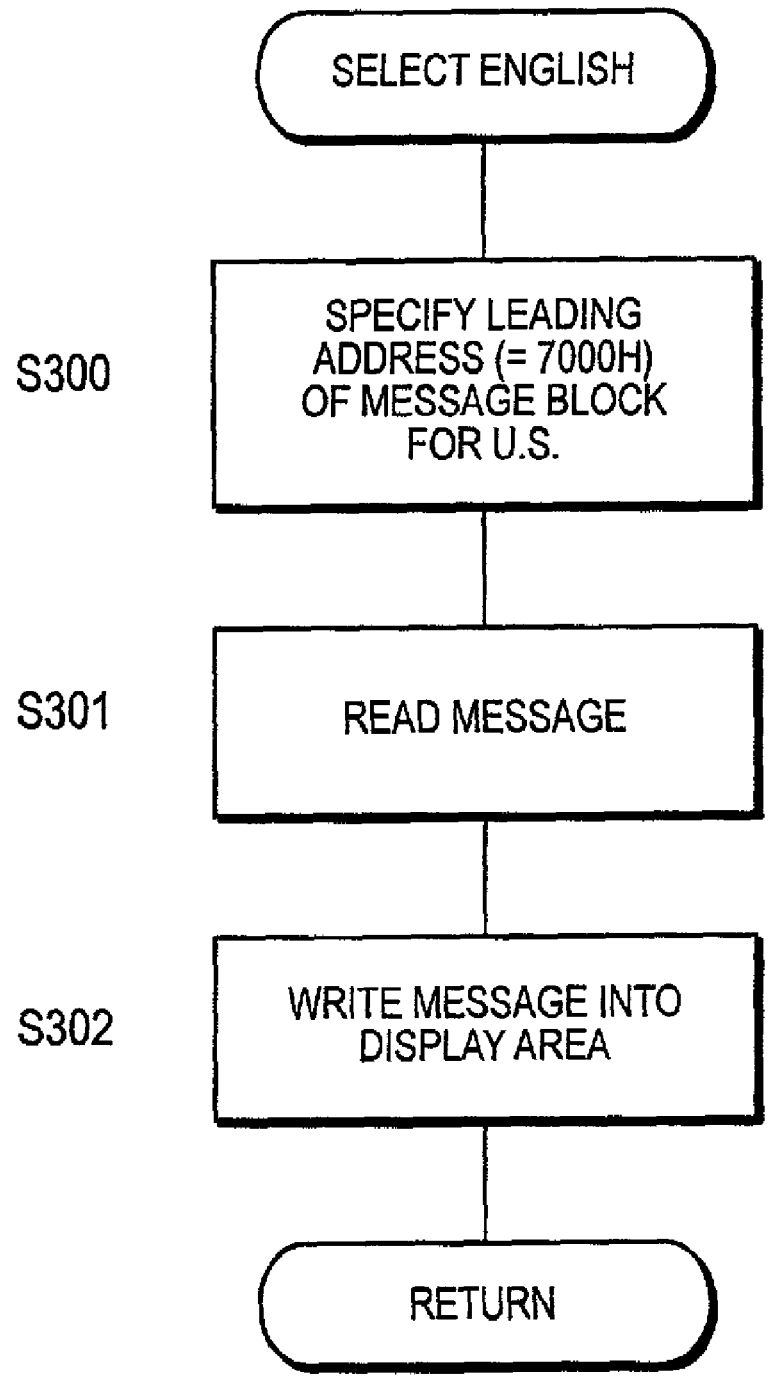
FIG. 12 is a flow chart specifically showing the selection process of language setup shown in the step S204 of FIG. 7.

FIG. 12 is a flow chart that shows the contents of the subroutine specifically showing the selection process of the language setup shown in the step S204 of FIG. 7.

At the step S300, the memory address (storage address) of the message block for the United States 474. Preferably, the leading address of the message block for the United States 474 is specified as described in the above. For example, the leading address 7000H of the message block for the United States 474 is specified.

More specifically, a table that correlates the regional information that can be set in the computer 100 using the operating system 600 with the leading address of each of the message blocks 472, 474 and 476 (i.e., setup information) that correspond to the data section of teach region is stored in the CD-ROM 400. Therefore, when the regional information stored in the computer 100 is set up for the United States, the message block for the United States 474 can be selected as a setup information by specifying the address corresponding to the regional information by referring to this table. Consequently, English is set up as the display language.

At the step S301, the message (word) used on the display screen is sequentially read according to the specified address in 7000's that corresponds to the specified message block for the United States 474.

At the step S302, the message read by the step S301 is sequentially written on the display area set up on the screen by the printer driver screen display module 464 of the control program block 460.

Figure 13:
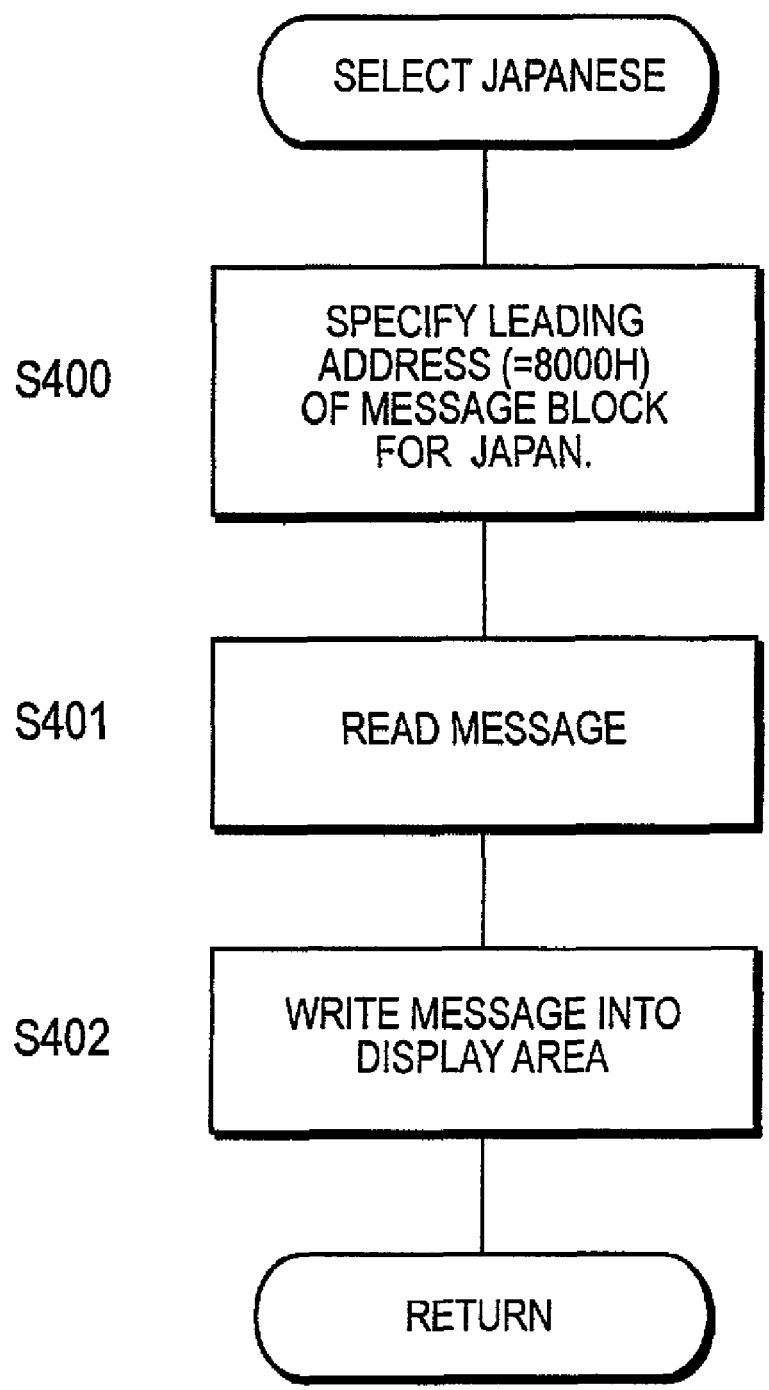
FIG. 13 is a flow chart specifically showing the selection process of language setup shown in the step S208 of FIG. 7.

FIG. 13 is a flow chart specifically showing the selection process of language setup shown in the step S208 of FIG. 7.

At the step S400, the leading address 8000H of the message block for Japan is specified and set up. At the step S401, the messages used in the display panel are sequentially read according the specified addresses in 8000's corresponding to the specified message blocks for Japan. At the step S402, the messages read at the step S401 are sequentially written to the display area set up by the printer driver screen display module 464 of the control program block 460.

Thus, by means of using the printer driver according to the second embodiment, it becomes unnecessary to keep multiple printer drivers in order to install a printer driver with the contents matching each of the regional information. More specifically, the control program block 460 within the printer driver 450 can be used for all of the regions as a common program.

As can be seen from the above, the method of installing printer drivers according to the second embodiment makes it possible to install a printer driver by automatically referring to the regional information preset in the computer 100 and selecting the setup information including various information such as the default settings for the display language and the measuring unit system and/or the default setup for the printing paper size for the printing condition setup screen.

The present information is not limited to the embodiments described above but rather it can be modified in various ways within the spirit of the invention.

For example, although it was described in the above using the display language, the printing paper size and the measuring unit system as examples of setup information selectable based on the regional information, the invention is not limited to them. For example, if the invention is applied to a printer that prints the date and time of printing automatically on the header portion of the document, it is possible to select the date and time format commonly used in the referred region.

Moreover, although the method of installing the printer drive was described in the above using a case where the printer driver to be installed is stored in a CD-ROM or on a flexible disk, the invention is not limited to it. For example, it is obvious that it can be applied to case of installing the printer driver stored on a different kind of recording medium such as an optical-magnetic disk or a ZIP drive disk.

Furthermore, the invention makes it possible to select the default setting of the measuring unit system and the default setting of the printing paper size on the basis of the regional information during the installation of the printer driver, the invention does not prevent the user from arbitrarily changing the setup of the measuring unit system and the printing paper size setting later.

The information concerning the display language, the printing paper size, and the measuring unit system can be prepared in advance by each region, the invention does not prevent a portion of the data to be used as common data for multiple regions. For example, between Japan and France, the measuring unit system (the metric system) is the same despite the fact that the display languages (Japanese and French) are different. Therefore, although it is necessary to store the display language data separately in the memory, there is no need to store the default setup data for the measuring unit system separately.

Furthermore, the regional information in the above description includes the information (language setup information) concerning the language set in advance in the computer corresponding to the region, in which the computer is used.

In each of the embodiment described in the above, the installation process of the printer drive is performed as the CPU 120 executes the specified program, which describes the above processing sequence (FIG. 5, FIG. 7, FIG. 12 and FIG. 13), and the specified program can be provided by the computer readable recording media (e.g., flexible disk, CD-ROM, etc.). The specified program can also be provided as a portion of, for example, the document application software.

What is claimed is:

1. A method for installing a printer driver stored on a recording medium on a computer terminal, comprising:

a step of automatically referring to regional information identifying a particular region before the printer driver is installed on the computer terminal, the regional information being set in said computer terminal in advance;

a selection step of automatically selecting a piece of setup information from multiple pieces of setup information stored on said recording medium on the basis of the referred to regional information, the multiple pieces of setup information corresponding to multiple different regions, respectively, wherein the selected piece of setup information affects assortment of selectable items to be displayed on a screen initiated by the printer driver when a printing is executed by a user; and a step of installing a control program contained in the printer driver and the selected piece of setup information on the computer terminal, wherein the control program is common to the different regions, whereby the printer driver is installed on the computer terminal, wherein said selection step comprising steps of:

referring to a table that correlates the regional information with addresses where each piece of setup information is stored; and selecting a piece of setup information from multiple pieces of information by specifying an address corresponding to the regional information.

2. The method of installation according to the claim 1 wherein said selection step is executed by using a setup selection module contained in said control program.

3. The method of installation according to the claim 1 wherein said setup information includes language information used for displaying the status of printing conditions on a screen.

4. The method of installation according to the claim 1 wherein said setup information includes information on printing paper sizes to be used on the printer.

5. The method of installation according to the claim 1 wherein said setup information includes information on measurement unit systems to be used for setting up printing conditions and displays.

6. The method of installation according to the claim 1 wherein said regional information set in the computer terminal in advance includes information concerning languages set in the computer terminal.

7. The method of installation according to claim 1 wherein the step of automatically referring to regional information includes automatically determining the particular region from among a plurality of different regions set in the computer terminal in advance.

8. A computer-readable medium storing a printer driver containing a control program and multiple pieces of setup information corresponding to each regional information, and an installation program for installing said printer driver to a computer terminal, wherein;
said installation program causing a computer to execute a process comprising;
a step of automatically referring to regional information identifying a particular region before the printer driver is installed to the computer terminal, the regional information being setup on said computer terminal in advance;
a selection step of automatically selecting a piece of setup information from the multiple pieces of information stored on said computer-readable medium on the basis of the referred to regional information, the pieces of information corresponding to multiple different regions, respectively, wherein the selected piece of setup information affects assortment of selectable items to be displayed on a screen initiated by the printer driver when a printing is executed by a user; and
a step of installing a control program contained in the printer driver and the selected piece of setup information on the computer terminal, wherein the control program is common to the different regions,
whereby the printer driver is installed to the computer terminal,
the computer-readable medium according further storing a table that correlates the regional information with addresses where each setup information is stored, wherein
said selection step selects a piece of setup information by specifying an address corresponding to the regional information based on said table.

9. The computer-readable medium according to the claim 8 wherein said selection step is executed by using a setup selection module contained in said control program.

10. The computer-readable medium according to the claim 8 wherein said setup information includes language information used for displaying the status of printing conditions on a screen.

11. The computer-readable medium according to the claim 8 wherein said setup information includes information on printing paper sizes to be used on the printer.

12. The computer-readable medium according to the claim 8 wherein said setup information includes information on measurement unit systems to be used for setting up printing conditions and displays.

13. The computer-readable medium according to claim 8 wherein the step of automatically referring to regional information includes automatically determining the particular region from among a plurality of different regions set in the computer terminal in advance.

14. A method for installing a printer driver for a printer on a computer terminal comprising:
a step of automatically referring to regional information identifying a particular region before the printer driver is installed on the computer terminal, the regional information being set in said computer terminal in advance;
a step of automatically selecting a piece of setup information from a plurality of pieces of setup information on the basis of the referred to regional information, the plurality of pieces of setup information respectively corresponding to multiple different regions and being for the printer, wherein the selected piece of setup information affects assortment of selectable items to be displayed on a screen initiated by the printer driver when a printing is executed by a user; and
a step of installing a control program contained in the printer driver and the selected piece of setup information on the computer terminal, wherein the control program is common to the different regions,
whereby the printer driver is installed on the computer terminal,
wherein said selection step comprises steps of:
referring to a table that correlates the regional information with addresses where each piece of setup information is stored; and
selecting a piece of setup information from multiple pieces of information by specifying an address corresponding to the regional information.

15. The method of installation according to the claim 14, wherein said selection step is executed by using a setup selection module contained in said control program.

16. The method of installation according to the claim 14, wherein said setup information includes language information used for displaying the status of printing conditions on a screen.

17. The method of installation according to the claim 14, wherein said setup information includes information on printing paper sizes to be used on the printer.

18. The method of installation according to the claim 14, wherein said setup information includes information on measurement unit systems to be used for setting up printing conditions and displays.

19. The method of installation according to the claim 14, wherein said regional information set in the computer terminal in advance includes information concerning languages set in the computer terminal.

20. The method of installation according to the claim 14, wherein the plurality of pieces of setup information are stored in a computer-readable recording medium.

21. The method of installation according to claim 14, wherein the step of automatically referring to regional information includes automatically determining the particular region from among a plurality of different regions set in the computer terminal in advance.

22. A computer-readable recording medium storing an installation program that causes a computer terminal to execute a method for installing a printer driver for a printer on a computer terminal comprising:

a step of automatically referring to regional information identifying a particular region before the printer driver is installed on the computer terminal, the regional information being set in said computer terminal in advance;

a step of automatically selecting a piece of setup information from a plurality of pieces of setup information on the basis of the referred to regional information, each of the plurality of pieces of setup information being for the printer, wherein the selected piece of setup information affects assortment of selectable items to be displayed on a screen initiated by the printer driver when a printing is executed by a user; and a step of installing a control program contained in the printer driver and the selected piece of setup information on the computer terminal, wherein the control program is common to the different regions, whereby the printer driver is installed on the computer terminal, wherein said selection step comprising steps of:

referring to a table that correlates the regional information with addresses where each piece of setup information is stored; and selecting a piece of setup information from multiple pieces of information by specifying an address corresponding to the regional information.

23. The computer-readable recording medium according to claim 22 wherein the step of automatically referring to regional information includes automatically determining the particular region from among a plurality of different regions set in the computer terminal in advance.

24. A method for installing a device driver on a computer terminal, the method comprising:

providing a region independent control program block and a plurality of region dependent message blocks;

detecting a region where the computer terminal belongs by checking regional information set in the computer terminal in advance;

automatically selecting, before the device driver is installed, one of the plurality of region dependent message blocks on the basis of the detected region where the computer terminal belongs; and installing the device driver customized to one of the regions where the computer terminal belongs, by installing the region independent control program and one of the plurality of region dependent message blocks in accordance with the region where the computer terminal belongs;

wherein the one of the plurality of region dependent message blocks affects assortment of selectable items to be displayed on a screen initiated by the device driver when a printing is executed by a user; and wherein the step of detecting comprising a step of:

referring to a table that correlates the regions with addresses where each of the plurality of region dependent message blocks is stored.

25. The method of installation according to claim 24, wherein the step of selecting is executed by using a setup selection module contained in said region independent control program block.

26. The method of installation according to claim 24, wherein the plurality of region dependent message blocks contain information about the display language.

27. The method of installation according to claim 24, wherein the plurality of region dependent message blocks contain information on measurement unit systems dependent on the regions, respectively.

28. The method of installation according to claim 24, wherein the device driver is a printer driver, and wherein the plurality of region dependent message blocks contain information on printing paper sizes dependent on the regions, respectively.

29. A computer readable recording medium storing an installation program, a region independent control program block, and a plurality of region dependent message blocks, the installation program causing a computer terminal to execute a method for installing a device driver on a computer terminal comprising:

detecting a region where the computer terminal belongs by checking regional information set in the computer terminal in advance;

automatically selecting, before the device driver is installed, one of the plurality of region dependent message blocks on the basis of the detected region where the computer terminal belongs;

installing the device driver customized to the region where the computer terminal belongs, by installing a control program and the selected one of the plurality of message blocks;

wherein the one of the plurality of region dependent message blocks affects assortment of selectable items to be displayed on a screen initiated by the device driver when a printing is executed by a user; and wherein the step of detecting comprising a step of:

referring to a table that correlates the regions with addresses where each of the plurality of region dependent message blocks is stored.

30. The computer readable recording medium according to claim 29, wherein the plurality of a region dependent message blocks contain information about the display language.

31. The computer readable recording medium according to claim 30, wherein the step of selecting is executed by using a setup selection module contained in said region independent program block.

32. The computer readable recording medium according to claim 29, wherein the plurality of a region dependent message blocks contain information on measurement unit systems dependent on regions, respectively.

33. The computer readable recording medium according to claim 29, wherein the device driver is a printer driver, and wherein the plurality of region dependent message blocks contain information on printing paper sizes dependent on the regions, respectively.

* * * * *

UNITED STATES PATENT AND TRADEMARK OFFICE
CERTIFICATE OF CORRECTION

PATENT NO. : 7,640,554 B2
APPLICATION NO. : 09/910282
DATED : December 29, 2009
INVENTOR(S) : Yasushi Yamade It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 896 days.

Signed and Sealed this

Sixteenth Day of November, 2010

David J. Kappos
*Director of the United States Patent and Trademark Office*